(12) United States Patent
Mars et al.

(10) Patent No.: US 11,994,605 B2
(45) Date of Patent: May 28, 2024

(54) DIRECTION OF ARRIVAL ESTIMATION DEVICE, SYSTEM, AND DIRECTION OF ARRIVAL ESTIMATION METHOD

(71) Applicant: Panasonic Intellectual Property Corporation of America, Torrance, CA (US)

(72) Inventors: Rohith Mars, Singapore (SG); Srikanth Nagisetty, Singapore (SG); Chong Soon Lim, Singapore (SG); Hiroyuki Ehara, Kanagawa (JP); Akihisa Kawamura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 192 days.

(21) Appl. No.: 17/600,513

(22) PCT Filed: Mar. 16, 2020

(86) PCT No.: PCT/JP2020/011534
§ 371 (c)(1),
(2) Date: Sep. 30, 2021

(87) PCT Pub. No.: WO2020/217781
PCT Pub. Date: Oct. 29, 2020

(65) Prior Publication Data
US 2022/0120839 A1    Apr. 21, 2022

(30) Foreign Application Priority Data
Apr. 24, 2019 (JP) ................. 2019-082998

(51) Int. Cl.
*G01S 3/802* (2006.01)
*G01S 3/808* (2006.01)
*H04R 1/40* (2006.01)

(52) U.S. Cl.
CPC .......... *G01S 3/8027* (2013.01); *G01S 3/8083* (2013.01); *H04R 1/406* (2013.01)

(58) Field of Classification Search
CPC .. H04R 3/005; H04R 1/406; H04R 2201/401; H04R 2201/405; G10L 19/008;
(Continued)

(56) References Cited

U.S. PATENT DOCUMENTS 10,080,088 B1 * 9/2018 Yang ..................... H04S 7/30
2012/0093344 A1   4/2012 Sun et al.
(Continued)

FOREIGN PATENT DOCUMENTS

JP         2012-523731 A      10/2012

OTHER PUBLICATIONS

Rohith Mars et al., "Multi-Sourcedirection-Of-Arrivalestimationusingimprovedestimationconsistencymethod",arXiv:1912. 11781v1,ORG,CornellUniversityLibrary,2010lin Library, CornellUniversity,Ithaca,NY14853,Dec. 26,2019,XP081566327. Dec. 26, 2019.*

(Continued)

*Primary Examiner* — Lun-See Lao
(74) *Attorney, Agent, or Firm* — Greenblum & Bernstein, P.L.C.

(57) ABSTRACT

Provided is a direction of arrival estimation device wherein: a calculation circuit calculates a frequency weighting factor for each of a plurality of frequency components of signals recorded in a microphone array, on the basis of the differences among unit vectors indicating the directions of the sound sources of each of the plurality of frequency components; and an estimation circuit estimates the direction of arrival of a signal from the sound source, on the basis of the frequency weighting factors.

9 Claims, 15 Drawing Sheets

(58) Field of Classification Search
CPC ....... G10L 2021/02166; G10L 21/0208; G10L 21/0272; H04S 2420/11; G06F 18/2134
USPC .................................. 381/22–25, 92; 700/94
See application file for complete search history.

(56) References Cited

U.S. PATENT DOCUMENTS

| | | | |
|---|---|---|---|
| 2013/0108078 A1* | 5/2013 | Ma | H04R 3/04 381/103 |
| 2015/0146882 A1* | 5/2015 | McCowan | H04R 3/005 381/92 |
| 2018/0255395 A1* | 9/2018 | Kanamori | G01S 3/8083 |

OTHER PUBLICATIONS

Extended European Search Report, dated Jun. 7, 2022, by the European Patent Office (EPO), for the European Patent Application No. 20795773.9.
Rohith Mars et al., "Multi-Source Direction-Of-Arrival Estimation Using Improved Estimation Consistency Method", arXiv:1912. 11781v1, ORG, Cornell University Library, 201 Olin Library, Cornell University, Ithaca, NY 14853, Dec. 26, 2019, XP081566327.
Hafezi et al., "Multiple Source Localization Using Estimation Consistency In The Time-Frequency Domain", ICASSP, pp. 516-520, Mar. 2017.
International Search Report (including English Language Translation), mailed Jun. 9, 2020 by the Japan Patent Office (JPO), in International Application No. PCT/JP2020/011534.

\* cited by examiner

DIRECTION OF ARRIVAL ESTIMATION DEVICE, SYSTEM, AND DIRECTION OF ARRIVAL ESTIMATION METHOD

TECHNICAL FIELD

The present disclosure relates to a direction-of-arrival estimation apparatus, a system, and a direction-of-arrival estimation method.

BACKGROUND ART

A sound capturing device, for example, is used for recording in a sound field. The sound capturing device is composed of a plurality of directional microphones or omnidirectional microphones that are arranged in a tetrahedral or spherical shape in the sound field, for example. Acoustic information recorded by the sound capturing device is used for estimating a direction of arrival of a direction of each sound source (i.e., a sound wave (or also called an acoustic signal)) present in the sound field, for example.

CITATION LIST

Non Patent Literature

NPL 1
S. Hafezi, A. H. Moore and P. A. Naylor, "Multiple source localization using estimation consistency in the time-frequency domain", ICASSP, pp. 516-520, March 2017.

SUMMARY OF INVENTION

However, there is scope for further study on a method of estimating a direction of arrival of an acoustic signal.

One non-limiting and exemplary embodiment facilitates providing a direction-of-arrival estimation apparatus, a system, and a direction-of-arrival estimation method each capable of improving estimation accuracy for a direction of arrival of an acoustic signal.

A direction-of-arrival estimation apparatus according to an embodiment of the present disclosure includes: calculation circuitry, which, in operation, calculates a frequency weighting factor for each of a plurality of frequency components of a signal recorded by a microphone array based on a difference between unit vectors each indicating a direction of a sound source in a corresponding one of the plurality of frequency components; and estimation circuitry, which, in operation, estimates a direction of arrival of the signal from the sound source based on the frequency weighting factor.

It should be noted that general or specific embodiments may be implemented as a system, an apparatus, a method, an integrated circuit, a computer program, a storage medium, or any selective combination thereof.

According to an embodiment of the present disclosure, it is possible to improve an extraction performance of an acoustic object sound.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENT

Hereinafter, an embodiment of the present disclosure will be described in detail with reference to the accompanying drawings.

For example, an ambisonic signal corresponding to a sound field is obtained directly from a B-format microphone or indirectly from an A-format microphone. This sound field can be expressed in First Order Ambisonics (FOA), for example. Alternatively, the sound field can be expressed in Higher Order Ambisonics (HOA) by a signal obtained using a Spherical Microphone Array (SMA).

Applications using the ambisonic signal expressed in the HOA (hereinafter, also referred to as an HOA signal) include estimation of Directions of Arrival (DoA) of sound waves (e.g., also called acoustic signals, speech signals, or audio acoustic signals) arriving from a plurality of sound sources present in the sound field, i.e., estimation of a direction of the sound field.

The DoA estimation for the acoustic signals can be applied to detection or tracking of the sound sources in a robot or a surveillance system, for example. The DoA estimation for the acoustic signals can also be applied to pre-processing of an acoustic beamformer or an acoustic codec, for example. Further, the DoA estimation for the sound sources can be applied to pre-processing of a 6 Degrees of Freedom (DoF) application, which is a sound field navigation system using, for example, Collaborative Blind Source Separation (CBSS).

The following is a description of a method of performing the DoA estimation using the SMA, by way of example.

First of all, recorded signals (e.g., referred to as microphone input signals) by the SMA is converted from time domain to frequency domain using, for example, Fourier transform (e.g., Fast Fourier Transform (FFT)). Then, the converted microphone input signals are further converted into Spherical Harmonic Coefficients (SHC) or the HOA signals using Spherical Harmonic Transform (SHT).

In general, the more sound sources makes DoA estimation difficult because of echoes in the room, background noise or additive noise of microphones. Further, the DoA estimation becomes even more difficult when, for example, signals overlap with each other or a plurality of sound sources are located close to each other, in a case where the plurality of sound sources are activated at the same time.

Figure 1:
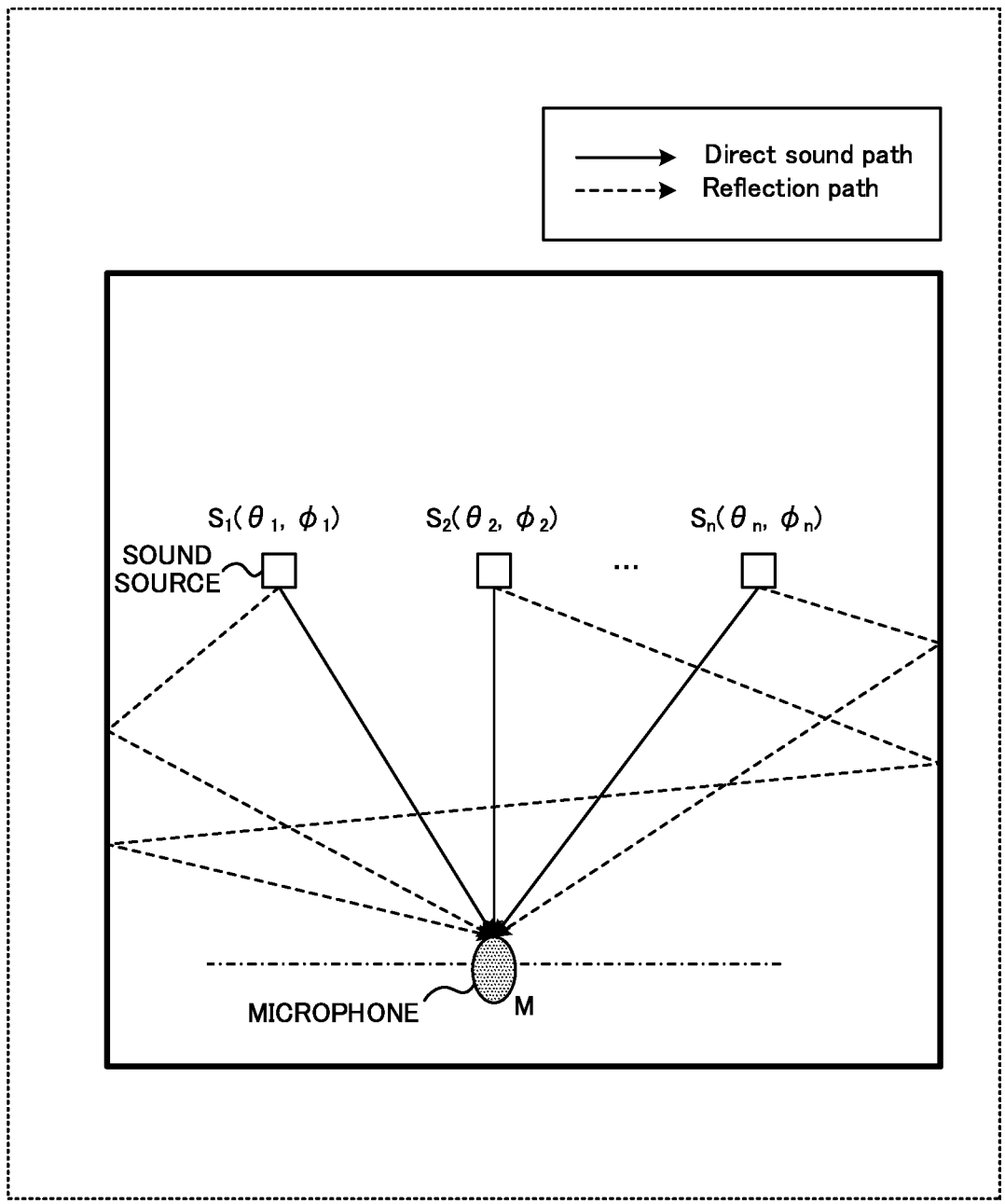
FIG. 1 illustrates an exemplary method of recording a plurality of sound fields by an ambisonic microphone.

FIG. 1 is a schematic diagram illustrating an example of recording signals from a sound field including sound sources $S_1$ to $S_n$ by ambisonic microphone M. In FIG. 1, Q microphones, for example, are arranged on the surface of ambisonic microphone M. FIG. 1 illustrates exemplary paths of direct and reflected waves from each of sound sources $S_1$ to $S_n$ to ambisonic microphone M.

In the DoA estimation using the SMA, a pseudo-intensity vector (PIV) is calculated (i.e., estimated), for example.

Figure 2:
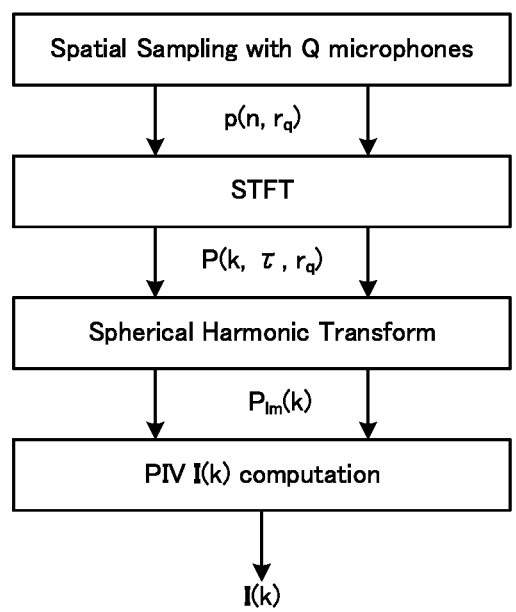
FIG. 2 illustrates an exemplary method of estimating a PIV using an SMA signal.

FIG. 2 illustrates an exemplary method of estimating the PIV using the SMA signal.

As illustrated in FIG. 2, the SMA records sound pressure p (n, $r_q$) relative to position $r_q$ at time n (may be represented as p (t, τ, $r_q$) with time n as "t, τ", where t is time in frame τ). Sound pressure p (n, $r_q$) is converted into frequency domain signal P (k, τ, $r_q$) by Short-Time Fourier Transform (STFT), where k represents a frequency bin number and τ represents a time frame number. Additionally, the SHT is performed on frequency domain signal P (k, τ, $r_q$) to obtain ambisonic signal $P_{lm}$(k) (i.e., also called eigenbeam) in FIG. 2.

The PIV (e.g., represented as I (k)) is calculated based on the first four channels of ambisonic signal $P_{lm}$, for example. In a case of the signal recorded in the B-format, for example, the four channels of $P_{lm}$ correspond to W, X, Y, and Z channels. For example, the W channel corresponds to an omnidirectional signal component. In addition, the X, Y, and Z channels respectively correspond to signal components in the up/down, left/right and forward/backward directions, for example.

In a case of the signal recorded by the SMA, PIV I (k) is calculated based on, for example, ambisonic signal $P_{lm}$(k) using the following Equation 1:

[1]
$$I(k) = \frac{1}{2} \text{Re}\left\{ P_{00}^*(k) \begin{bmatrix} P_x(k) \\ P_y(k) \\ P_z(k) \end{bmatrix} \right\}. \quad \text{(Equation 1)}$$

Herein, k represents a frequency bin number, and $P_{00}^*$(k) represents a complex conjugate of zero-order eigenbeam $P_{00}$(k) (e.g., W channel). In addition, $P_x$(k), $P_y$(k), and $P_z$(k) are obtained by a linear combination using the spherical harmonic coefficients to align (project) first-order eigenbeam $P_{1(-1)}$(k), $P_{10}$(k), and $P_{11}$(k) to the x, y, and z axes respectively.

Unit vector u indicating a sound source direction (or also referred to as a DoA unit vector) is given by, for example, the following Equation 2:

[2]
$$u = \frac{I(k)}{\|I(k)\|}. \quad \text{(Equation 2)}$$

Function $\|I(k)\|$ represents an L2 norm operation for I (k) in Equation 2.

The method of performing the DoA estimation using the SMA has been described, thus far.

For example, a low computational complexity estimation consistency (EC) approach has been proposed as a method of improving accuracy of the DoA estimation (see, for example, Non Patent Literature 1). In the EC approach, post-processing is applied to the DoA unit vector estimated for each time frequency bin (e.g., also referred to as a time frequency (TF) point). Such post-processing includes, for example, processing for estimating a parameter for identifying a single sound source or noise source, and processing for identifying a time frequency point with more accurate DoA information. The EC approach improves the DoA estimation accuracy while reducing the computational complexity.

Figure 3:
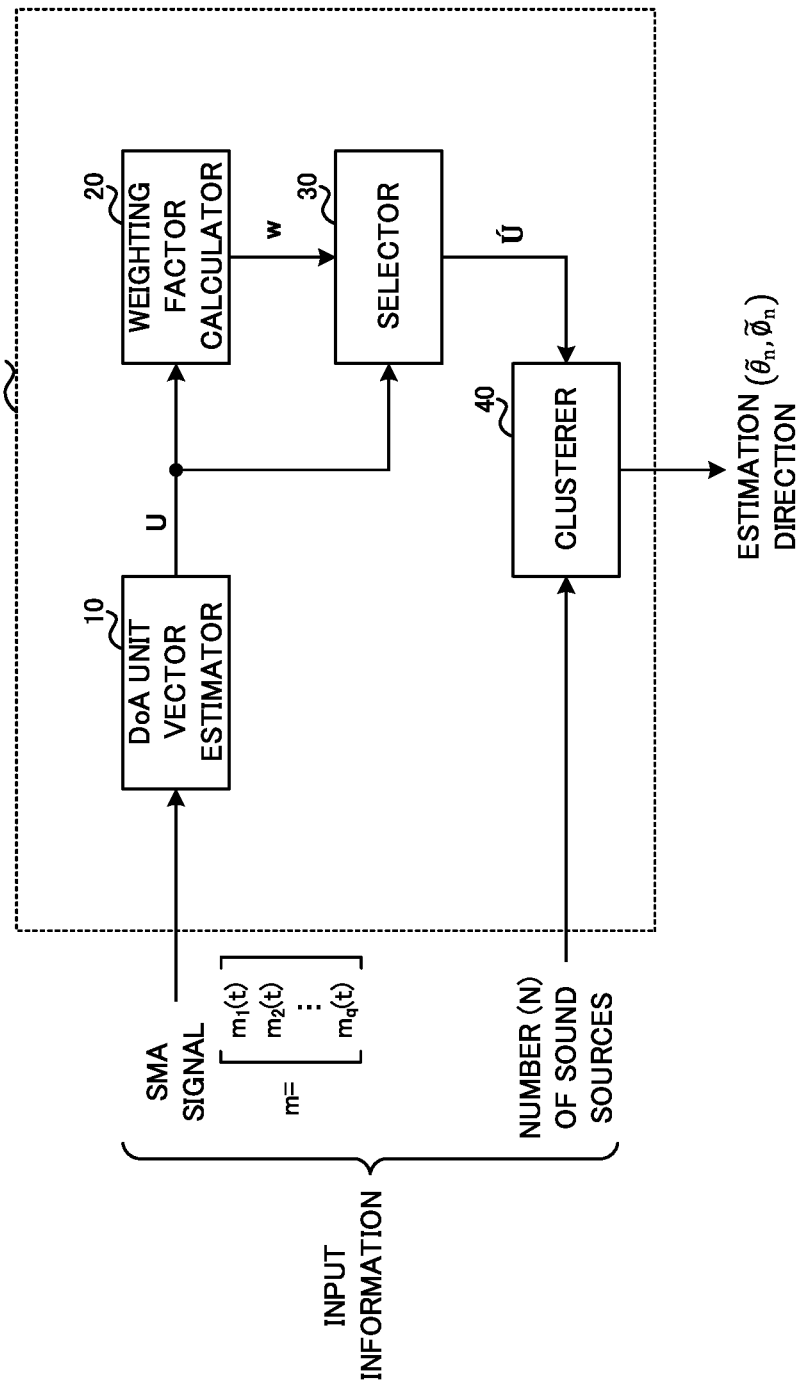
FIG. 3 is a block diagram illustrating an exemplary configuration of a direction-of-arrival estimation apparatus.

FIG. 3 is a block diagram illustrating an exemplary configuration of a direction-of-arrival estimation apparatus using the EC approach.

In direction-of-arrival estimation apparatus 1 illustrated in FIG. 3, DoA unit vector estimator 10 estimates the DoA unit vector based on an SMA signal to be inputted (in other words, a multichannel digital acoustic signal or an input audio spectrum). The SMA signal may be composed of, for example, acoustic signal m=[$m_1$(t), $m_2$(t), . . . , $m_q$(t)] recorded by q microphones. In the following, the DoA unit vector in time frame τ and frequency bin k is represented as "u(τ,k)" (or simply referred to as "u"). DoA unit vector u is mathematically represented by the following Equation 3:

[3]
$$u = \begin{bmatrix} \cos\theta\cos\phi \\ \sin\theta\cos\phi \\ \sin\phi \end{bmatrix}. \quad \text{(Equation 3)}$$

Herein, θ indicates an azimuth, and φ indicates an elevation.

Figure 4:
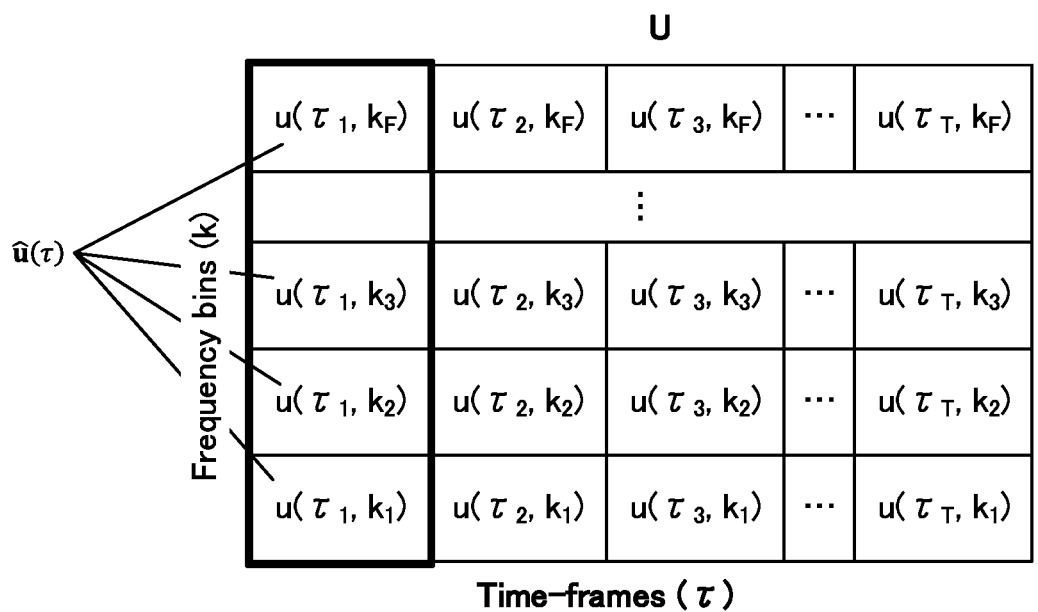
FIG. 4 illustrates exemplary DoA unit vectors.

The DoA unit vector is estimated for each time frequency point (e.g., τ and k) of the SMA signal, and forms, for example, matrix U (e.g., see FIG. 4). Direction-of-arrival estimation apparatus 1 illustrated in FIG. 3 performs the DoA estimation as follows, for example, based on DoA unit vector u (or matrix U).

Figure 5:
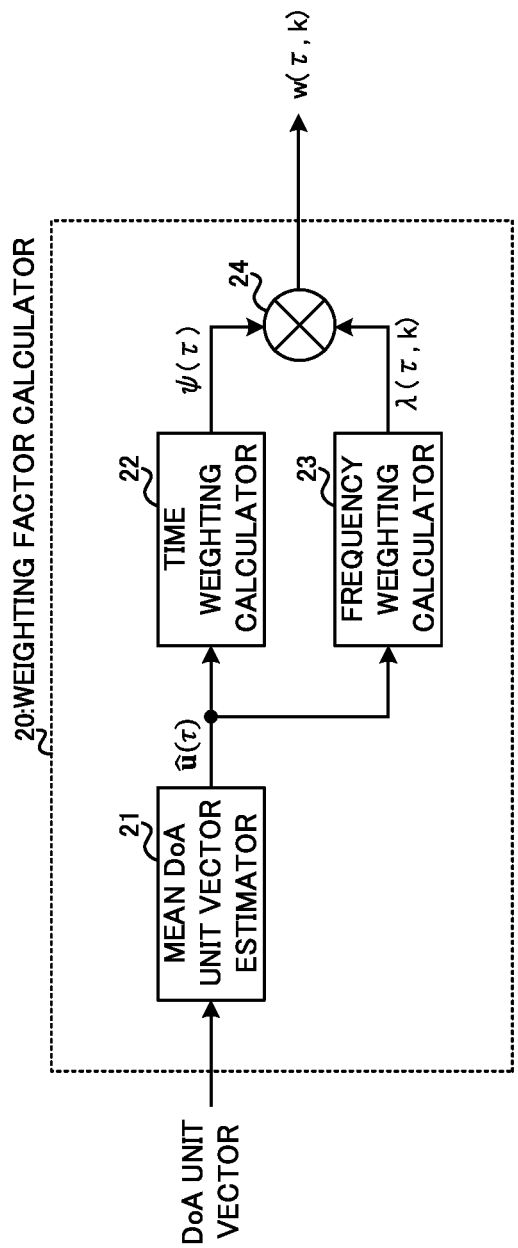
FIG. 5 is a block diagram illustrating an exemplary configuration of a weighting factor calculator.

Weighting factor calculator 20 includes, for example, mean DoA unit vector estimator 21, time weighting calculator 22, frequency weighting calculator 23, and multiplier 24, as illustrated in FIG. 5.

In FIG. 5, mean DoA unit vector estimator 21 calculates mean value û(τ) of DoA unit vectors u in each time frame τ as illustrated in FIG. 4, for example. Mean value û(τ) of the DoA unit vectors is expressed by, for example, the following Equation 4:

[4]

$$\hat{u}(\tau) = \frac{1}{K}\sum_{k=1}^{K} u(\tau, k).$$ (Equation 4)

For example, time weighting calculator 22 calculates, for each time frame τ, a time weighting factor for identifying whether the time frame is composed of a single sound source or a plurality of sound sources (including noise). Time weighting calculator 22 performs this estimation by, for example, calculating a coefficient of variation. For example, mean value u^(τ) of DoA unit vectors u in each time frame τ estimated in mean DoA unit vector estimator 21 may be used for the coefficient of variation. Time weighting calculator 22, for example, estimates whether time frame τ is composed of a single sound source or a plurality of sound sources based on the norm (∥u(τ)∣) of mean DoA unit vector u^(τ).

Time weighting calculator 22 calculates, for example, time weighting factor ψ(τ) expressed in the following Equation 5:

$$\psi(\tau) = 1 - \sqrt{1 - \|\hat{u}(\tau)\|}$$ (Equation 5).

ψ(τ) indicates whether time frame τ is composed of a single sound source or a plurality of sound sources or noise. For example, the closer ψ(τ) is to 1, the more likely there is a single sound source in time frame τ, and the closer ψ(τ) is to 0, the more likely there is a plurality of sound sources or noise in time frame τ.

Frequency weighting calculator 23 calculates a frequency weighting factor for identifying a frequency point that contributes to estimating the original DoA (i.e., accurate DoA) in the DoA estimation. For example, frequency weighting calculator 23 calculates frequency weighting factor λ(τ,k) based on angular deviation (i.e., angular distance) according to mean DoA unit vector u^(τ) of time frame τ. Frequency weighting factor λ(τ,k) is calculated, for example, by the following Equation 6:

[5]

$$\lambda(\tau, k) = 1 - \frac{1}{\pi}\cos^{-1}\frac{u(\tau, k)^T \hat{u}(\tau)}{\|u(\tau, k)\|\|\hat{u}(\tau)\|}.$$ (Equation 5)

Herein, $\cos^{-1}(u(\tau,k)^T u^{\wedge}(\tau)/\|u(\tau, k)\|\|u^{\wedge}(\tau)\|)$ is a radian expression of the angular deviation. The smaller the angular deviation is, the higher frequency weighting factor λ(τ,k) is. In other words, in Equation 6, frequency weighting factor λ(τ,k) is closer to 1 as the corresponding DoA unit vector u(τ,k) is closer to mean DoA unit vector u^(τ), and frequency weighting factor λ(τ,k) is closer to 0 as the corresponding DoA unit vector u(τ,k) is farther from mean DoA unit vector u^(τ).

Multiplier 24 estimates weighting factor w(τ, k) by the product of ψ(τ,k) and λ(τ,k), for example, as expressed in the following Equation 7:

$$w(\tau, k) = \psi(\tau) * \lambda(\tau, k)$$ (Equation 7).

Herein, "*" represents multiplication.

For example, higher weighting factor w(τ,k) is given to frequency component k having a DoA unit vector close to the mean DoA unit vector in time frame τ with a single sound source. In addition, higher weighting factor w(τ,k) is given to time frame τ where ψ(τ) is close to 1, for example, assuming a case where a single sound source is present (or is active) in each time frame. Meanwhile, lower weighting factor w(τ,k) is given to time frame τ where ψ(τ) is close to 0 because an echo or noise is likely to be present.

In FIG. 3, selector 30 selects, based on weighting factor w(τ,k), DoA unit vectors u(τ,k) in time frequency points that are assumed to be more accurate and likely to have a single sound source from among DoA unit vectors u(τ,k).

Figure 6:
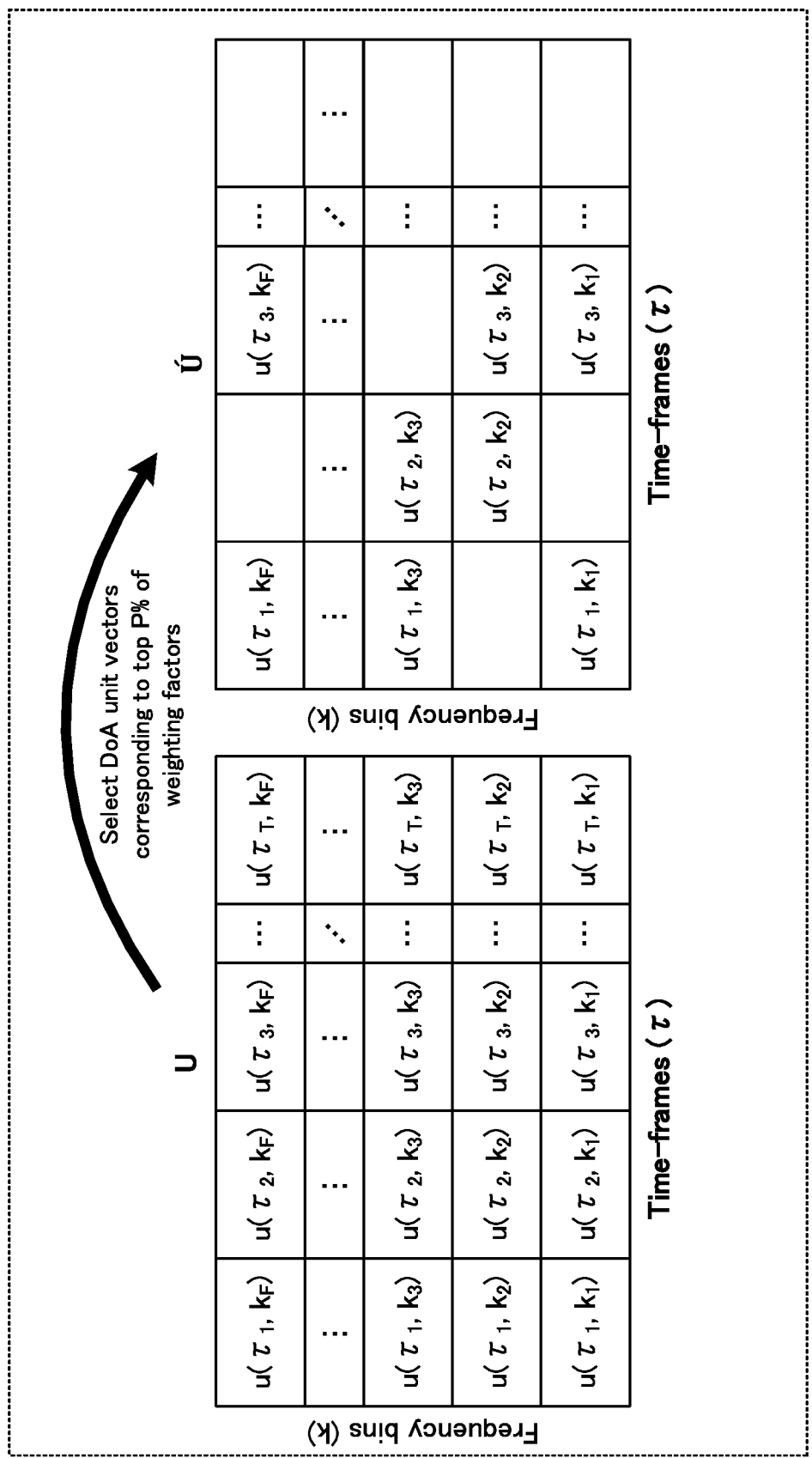
FIG. 6 illustrates exemplary selection of the DoA unit vectors.

For example, as illustrated in FIG. 6, selector 30 selects DoA unit vectors u(τ,k) corresponding to the top P % of the weighting factors from among weighting factors w(τ,k) each corresponding to a time frequency point (i.e., combination of τ and k). A matrix with the selected DoA unit vectors u(τ,k) as elements is "matrix U" illustrated in FIG. 6. Note that the value of P may be selected empirically, for example.

In FIG. 3, clusterer 40 performs clustering on matrix U composed of the selected DoA unit vectors u(τ,k) based on information on the number N of sound sources, for example, and outputs the centroid of each cluster as the DoA corresponding to each sound source.

An exemplary direction-of-arrival estimation apparatus using the EC approach has been described, thus far.

As described above, direction-of-arrival estimation apparatus 1 illustrated in FIG. 3 assumes the direction corresponding to mean DoA unit vector u^(τ) to be a sound source direction (DoA of an acoustic signal) in time frame τ. For example, direction-of-arrival estimation apparatus 1 performs calculation with the probability of DoA corresponding to the DoA unit vector in each time frequency point as a weighting factor, using the angular deviation between DoA unit vectors u in all time frequency points in a range of an observation object and mean DoA unit vector u^ in each time frame.

The mean DoA unit vector, however, possibly includes a DoA unit vector affected by a non-target sound source, ambient noise or echoes (i.e., outliers) as well. Thus, the calculated mean DoA unit vector possibly includes components of the non-target sound source, ambient noise, or echoes as bias. This possibly deteriorates accuracy of DoA estimation in direction-of-arrival estimation apparatus 1 illustrated in FIG. 3 due to the non-target sound source or noise components.

Additionally, in a case of a sound having a harmonic structure such as a vowel of speech, for example, signal components are sometimes concentrated in the peak portion of the harmonics, and the portion between the valleys of the spectrum is buried in the background noise accordingly. In such a case, original features of the DoA unit vector is possibly diluted in the mean DoA unit vector by, for example, the noise components. As described above, direction-of-arrival estimation apparatus 1 possibly fails to perform robust DoA estimation with a non-target sound source, ambient noise, echoes, or the like.

Also, when sound sources are present close to each other, for example, the mean DoA unit vector will be a mean value of DoA unit vectors corresponding to the directions of the sound sources close to each other (in other words, a direction not corresponding to any sound source directions) even without a non-target sound source or noise components, and thus the accuracy of DoA estimation is possibly deteriorated in direction-of-arrival estimation apparatus 1.

With this regard, an embodiment of the present disclosure provides a description of a method of improving the estimation accuracy for a DoA corresponding to a sound source.

Overview of System

Figure 7:
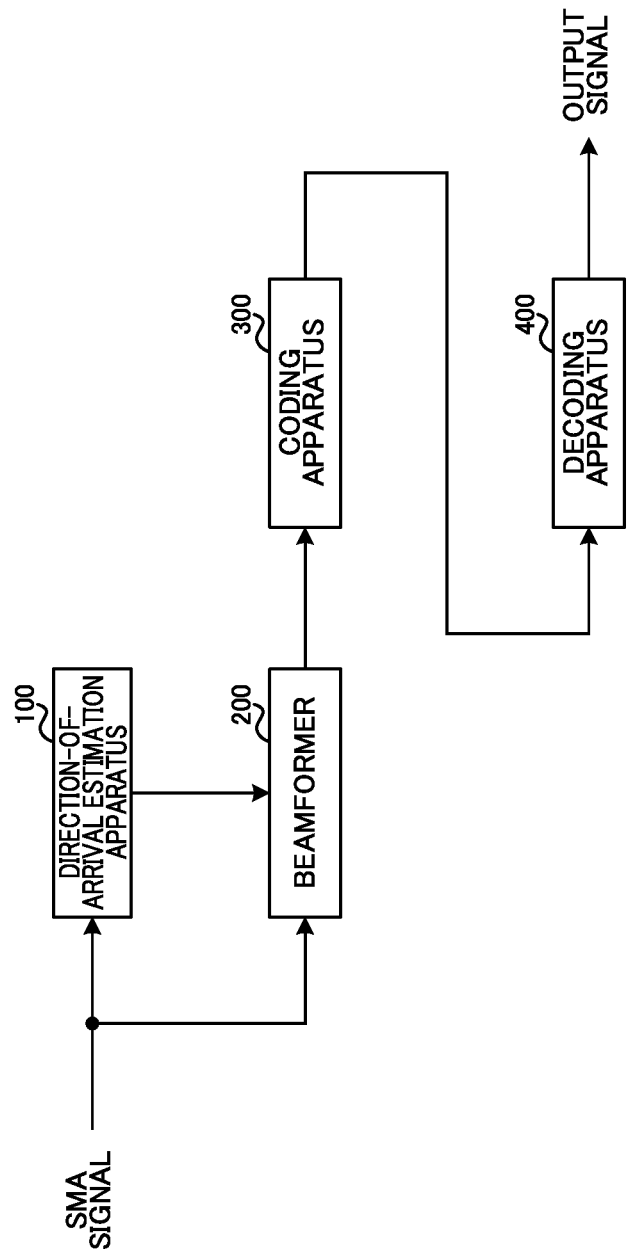
FIG. 7 is a block diagram illustrating an exemplary configuration of an acoustic signal transmission system according to an embodiment.

FIG. 7 illustrates an exemplary configuration of a system (e.g., acoustic signal transmission system) according to the present embodiment.

An acoustic signal transmission system illustrated in FIG. 7 includes, for example, direction-of-arrival estimation apparatus 100, beamformer 200, coding apparatus (also referred to as an encoder) 300, and decoding apparatus (also referred to as a decoder) 400.

In the acoustic signal transmission system illustrated in FIG. 7, a spherical microphone array (SMA) (not illustrated) inputs an SMA signal to direction-of-arrival estimation apparatus 100 and beamformer 200.

Direction-of-arrival estimation apparatus 100 estimates the direction of arrival (DoA) of a signal (e.g., acoustic signal) from a sound source based on the SMA signal, and outputs DoA information on the estimated DoA to beamformer 200. Note that exemplary operations in direction-of-arrival estimation apparatus 100 will be described later.

Beamformer 200 performs beamforming processing that forms a beam to the DoA based on the DoA information inputted from direction-of-arrival estimation apparatus 100 and the SMA signal. Beamformer 200 extracts a target acoustic signal by the beamforming processing to the DoA, and outputs the extracted acoustic signal to coding apparatus 300. Various methods are available for a method of configuring beamformer 200 and the beamforming processing.

Coding apparatus 300 encodes the acoustic signal inputted from beamformer 200, and transmits coding information to decoding apparatus 400 via, for example, a transmission path or a storage medium. For example, various audio-acoustic codecs (encoders) standardized by Moving Picture Experts Group (MPEG), 3rd Generation Partnership Project (3GPP) or International Telecommunication Union Telecommunication Standardization Sector (ITU-T), etc. may be used as coding apparatus 300.

Decoding apparatus 400 decodes the coding information (i.e., acoustic signal) received from coding apparatus 300 via, for example, the transmission path, the storage medium, etc., and converts the coding information into an electric signal. Decoding apparatus 400, for example, outputs the electric signal as a sound wave via a speaker or headphones. Note that decoders corresponding to the above-described audio-acoustic codecs, for example, may be used as decoding apparatus 400.

Note that the acoustic signal transmission system is not limited to have a configuration illustrated in FIG. 7. When a plurality of sound sources are present, for example, the DoA information can be handled as an acoustic object by being handled with the acoustic signal as metadata.

Figure 8:
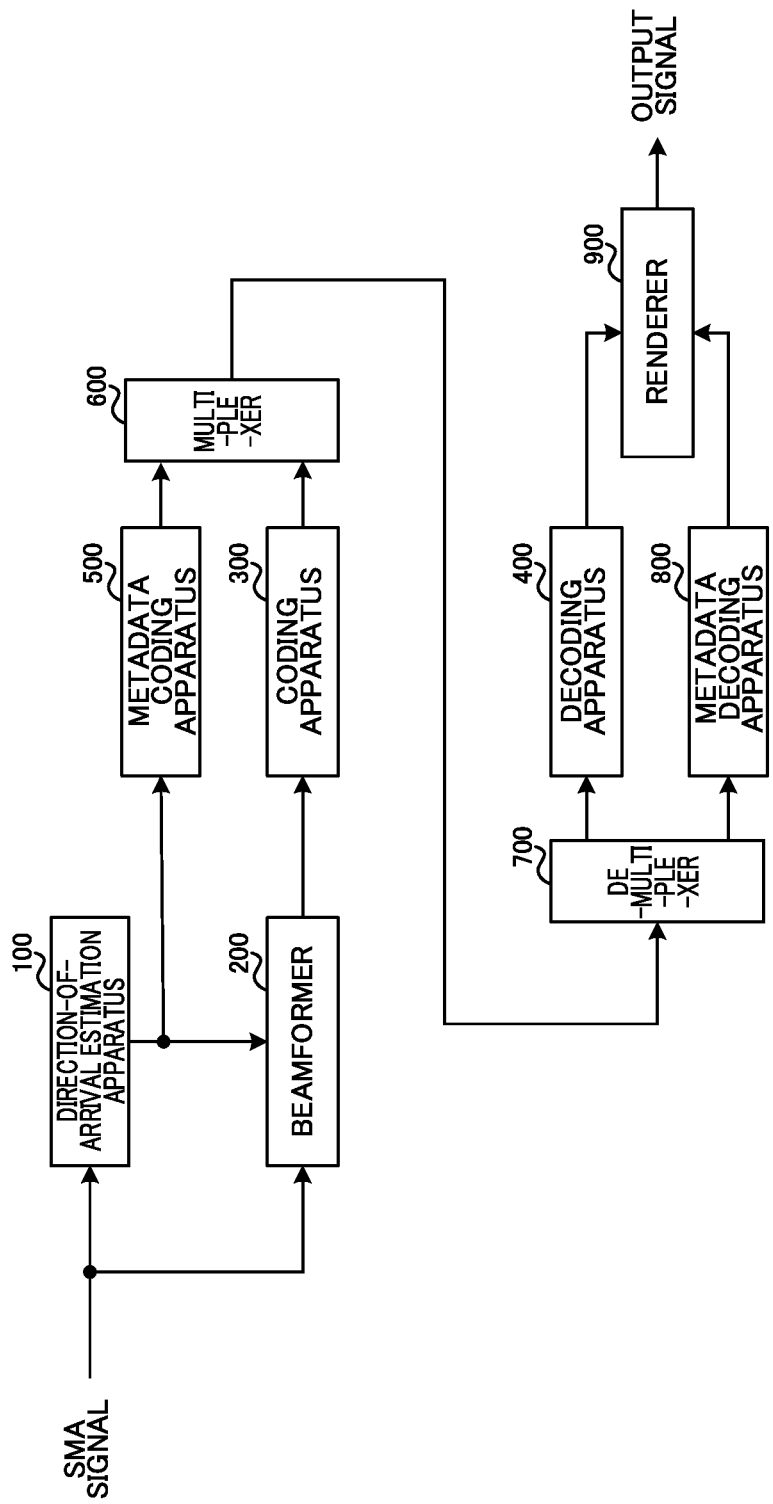
FIG. 8 is a block diagram illustrating another exemplary configuration of the acoustic signal transmission system according to the embodiment.

FIG. 8 illustrates an exemplary configuration of the acoustic signal transmission system for such a case. The acoustic signal transmission system illustrated in FIG. 8 further includes metadata coding apparatus 500, multiplexer 600, demultiplexer 700, metadata decoding apparatus 800 and renderer 900, in addition to the system illustrated in FIG. 7.

On the encoding side in FIG. 8, metadata coding apparatus 500 encodes the DoA information as metadata, and multiplexer 600 multiplexes the metadata coding information and the acoustic signal coding information. Meanwhile, on the decoding side in FIG. 8, demultiplexer 700 demultiplexes the received multiplexed information, and separates the information into the acoustic signal coding information and the metadata coding information. Metadata decoding apparatus 800 decodes the metadata coding information, and renderer 900 performs rendering processing on the decoded acoustic signal based on the information of the metadata, and outputs a stereoscopic acoustic signal.

Note that the configuration is not limited to the one illustrated in FIG. 8. For example, coding apparatus 300 may be configured to encode a plurality of acoustic objects, and metadata coding apparatus 500 may be configured to encode metadata for each of the plurality of acoustic objects. By way of example, FIG. 9 illustrates an exemplary configuration of the acoustic signal transmission system in a case of handling two acoustic objects.

Figure 9:
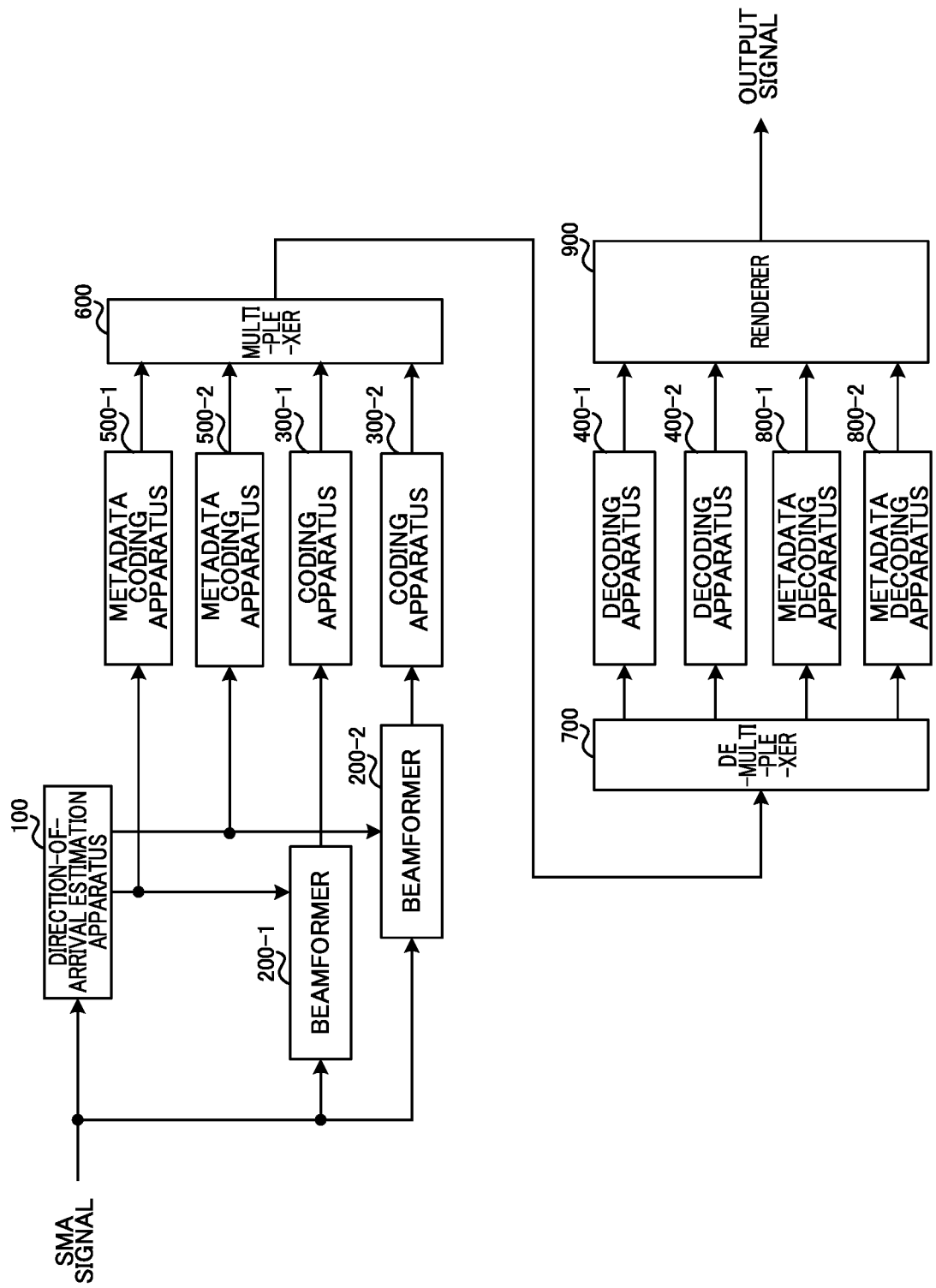
FIG. 9 is a block diagram illustrating still another exemplary configuration of the acoustic signal transmission system according to the embodiment.

On the transmission side illustrated in FIG. 9, direction-of-arrival estimation apparatus 100 outputs, for example, respective information on the directions of arrival of the two acoustic objects (e.g., DoA information) to beamformers 200-1 and 200-2, respectively. Beamformers 200-1 and 200-2 each extract an acoustic object signal of a direction-of-arrival component based on, for example, the DoA information and the SMA signal, and respectively outputs the acoustic object signals to coding apparatuses 300-1 and 300-2 as two types of acoustic object signals. Coding apparatuses 300-1 and 300-2 encode, for example, the two acoustic object signals respectively, and outputs the coding result (e.g., also referred to as acoustic object signal coding information) to multiplexer 600. Further, the respective information on the directions of arrival of the two acoustic object signals (e.g., DoA information) outputted from direction-of-arrival estimation apparatus 100 is outputted to metadata coding apparatuses 500-1 and 500-2 respectively. Metadata coding apparatuses 500-1 and 500-2 encode the DoA information as metadata, for example, and output the metadata coding information to multiplexer 600. Multiplexer 600, for example, multiplexes and packetizes the metadata coding information and the acoustic object signal coding information, and outputs the information to a transmission path. The multiplexed and packetized information is inputted to demultiplexer 700 on the receiving side via the transmission path.

On the receiving side illustrated in FIG. 9, demultiplexer 700 demultiplexes and packet-decomposes the multiplexed/packetized information into two pieces of acoustic object signal coding information and two pieces of metadata coding information. Demultiplexer 700 then outputs the two pieces of acoustic object signal coding information to decoding apparatuses 400-1 and 400-2 respectively, and outputs the two pieces of metadata coding information to metadata decoding apparatuses 800-1 and 800-2 respectively. Metadata decoding apparatuses 800-1 and 800-2, for example, decode the metadata coding information, and output the decoded metadata information to renderer 900. Decoding apparatuses 400-1 and 400-2, for example, decode the acoustic object signal coding information, and output the decoded acoustic object signals to renderer 900. Renderer 900, for example, performs rendering processing on the decoded acoustic object signals based on the decoded metadata information, and outputs stereoscopic acoustic signals (i.e., output signals) of a desired number of channels.

Note that, although FIG. 9 illustrates a configuration for encoding two types of acoustic objects, by way of example, the acoustic object signals to be encoded are not limited to two types, and three or more types of acoustic objects may be encoded. In addition, although FIG. 9 illustrates a case where the acoustic object signals are individually encoded and decoded one after another, by way of example, the present disclosure is not limited to this, and for example, may adopt a configuration where a plurality of acoustic object signals are collectively encoded and decoded as a multi-channel signal.

Figure 10:
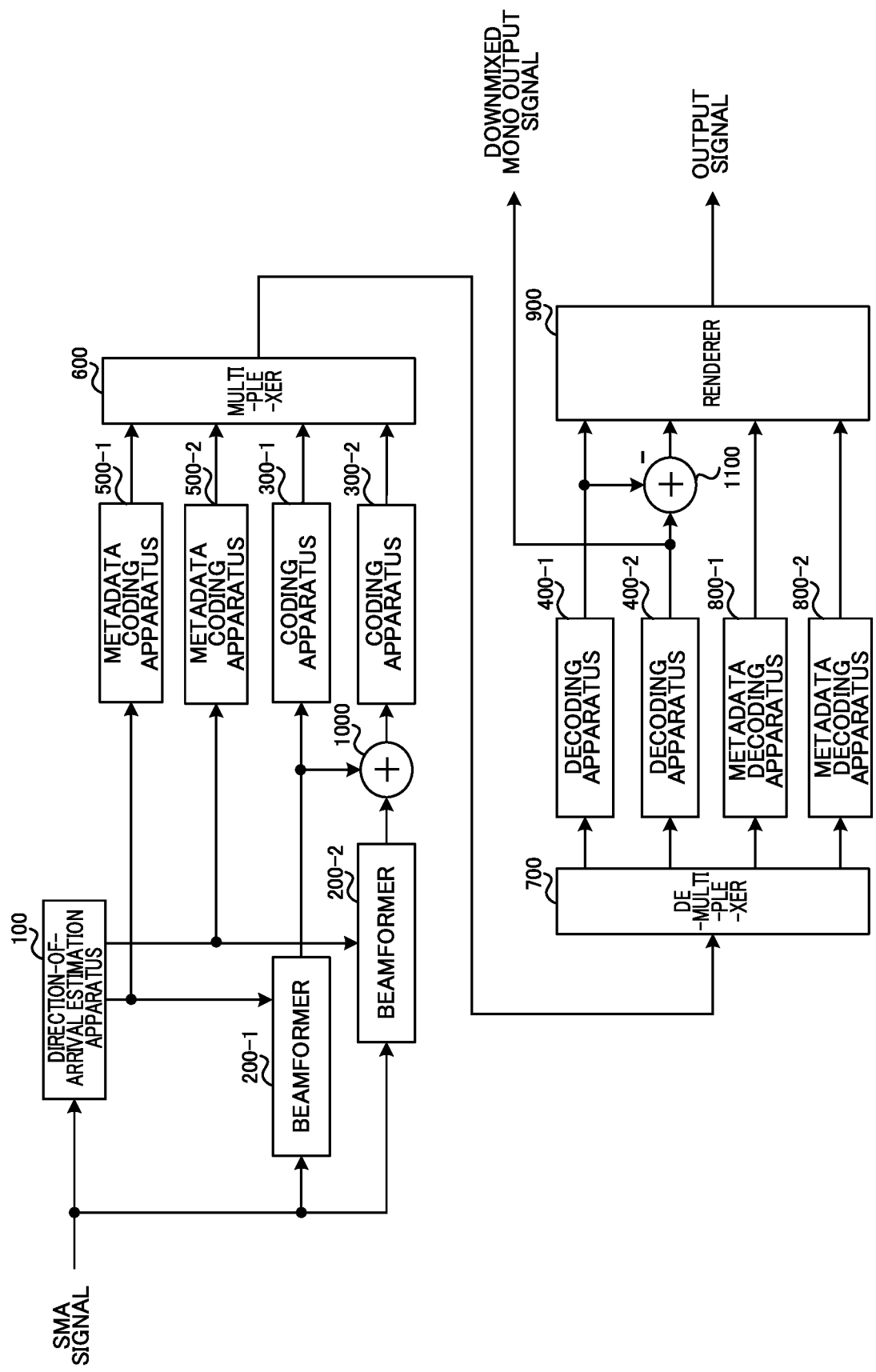
FIG. 10 is a block diagram illustrating still another exemplary configuration of the acoustic signal transmission system according to the embodiment.

FIG. 10 illustrates an exemplary scalable coding apparatus having a mono bitstream embedded configuration capable of outputting a bitstream in which an encoded bitstream of a mono signal obtained by downmixing a plurality of acoustic object signals is embedded, in the configuration of FIG. 9.

In coding apparatus 300-2 illustrated in FIG. 10, for example, a single acoustic object among a plurality of acoustic objects may be encoded as a mono acoustic signal added (i.e., downmixed) with another acoustic object in adder 1000. In addition, a decoded signal of the original acoustic object signal (before downmixing) may be obtained by, for example, subtractor 1100 subtracting another decoded acoustic object signal decoded in decoding apparatus 400-1 from the downmixed mono acoustic signal decoded in decoding apparatus 400-2 illustrated in FIG. 10.

With such a configuration, for example, a receiver equipped with decoding apparatus 400-2 corresponding to coding apparatus 300-2, which encodes the downmixed mono acoustic signal, can decode the downmixed mono acoustic signal without transcoding (i.e., tandem coding) by extracting and decoding only the encoded data portion of the downmixed mono acoustic signal.

Note that a method of selecting the acoustic object signal transmitted as the downmixed mono acoustic signal from among the plurality of acoustic object signals may be, for example, a method of selecting an acoustic object signal with the highest signal level among all the acoustic object signals. This selection method keeps a relative ratio small between a coding error of another acoustic object signal (e.g., components of another acoustic object signal remaining in the decoded signal) and the signal level of the acoustic object signal to be transmitted, in other words, the method maximizes the ratio of the components of the acoustic object signal to be transmitted.

Configuration of Direction-of-Arrival Estimation Apparatus

Next, an exemplary configuration of direction-of-arrival estimation apparatus 100 illustrated in FIG. 7 or FIG. 8 will be described.

Figure 11:
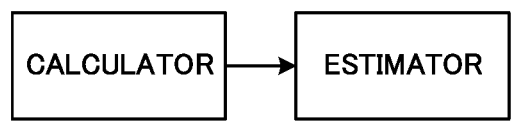
FIG. 11 is a block diagram illustrating an exemplary configuration of a part of a direction-of-arrival estimation apparatus according to the embodiment.

FIG. 11 is a block diagram illustrating a configuration of a part of direction-of-arrival estimation apparatus 100 according to the present embodiment. In direction-of-arrival estimation apparatus 100 illustrated in FIG. 11, a calculator (corresponding to, for example, weighting factor calculator 101 in FIG. 12 to be described later) calculates a frequency weighting factor for each of a plurality of frequency components (e.g., frequency bins or frequency points) of a signal recorded by a microphone array (e.g., SMA) based on a difference between unit vectors (e.g., DoA unit vectors) indicating the direction of a sound source in the plurality of frequency components. An estimator (corresponding to, for example, selector 30 and clusterer 40 in FIG. 12) estimates the direction of arrival of the signal based on the frequency weighting factors.

Figure 12:
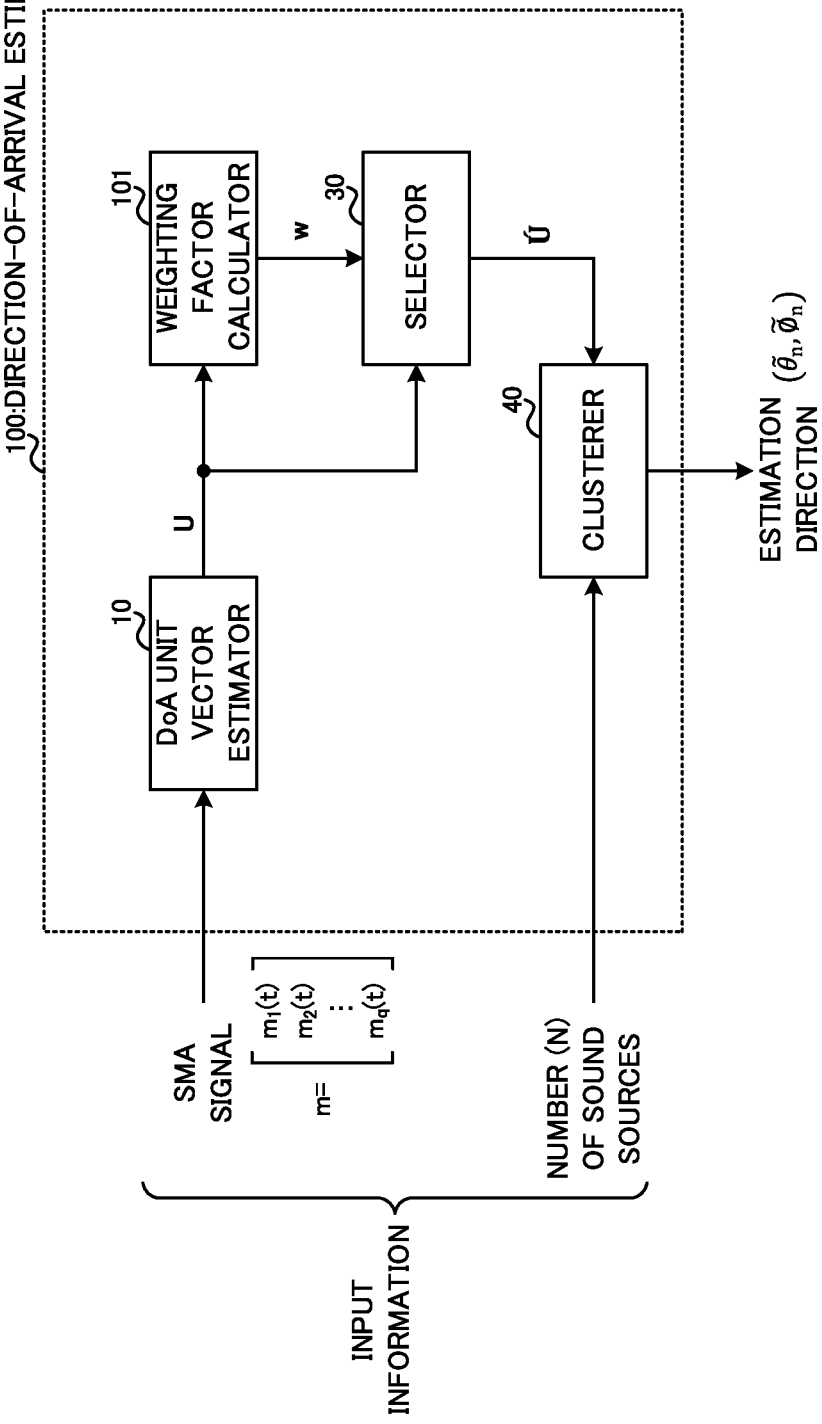
FIG. 12 is a block diagram illustrating an exemplary configuration of the direction-of-arrival estimation apparatus according to the embodiment.

FIG. 12 is a block diagram illustrating an exemplary configuration of direction-of-arrival estimation apparatus 100 according to the present embodiment.

Note that, in FIG. 12, the same components as those of direction-of-arrival estimation apparatus 1 illustrated in FIG. 3 are denoted by the same reference signs, and descriptions thereof are omitted. For example, in direction-of-arrival estimation apparatus 100 illustrated in FIG. 12, the operation of weighting factor calculator 101 is different from that of direction-of-arrival estimation apparatus 1 illustrated in FIG. 3.

Figure 13:
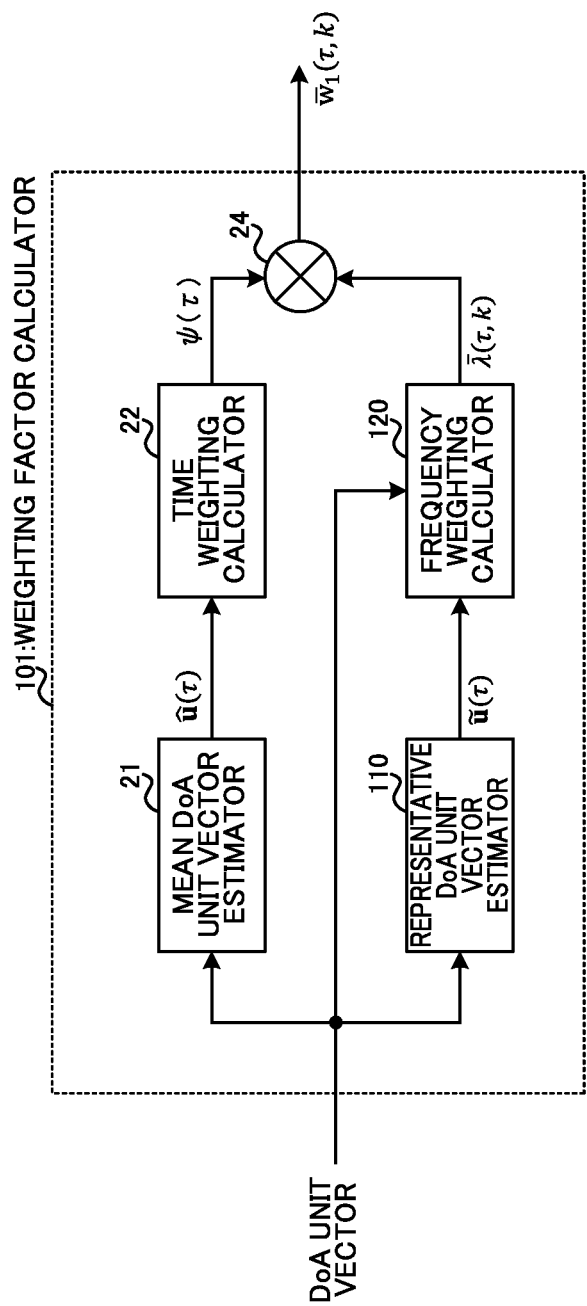
FIG. 13 is a block diagram illustrating an exemplary configuration of a weighting factor calculator according to the embodiment.

FIG. 13 is a block diagram illustrating an exemplary configuration of weighting factor calculator 101. Weighting factor calculator 101 illustrated in FIG. 13 includes, for example, mean DoA unit vector estimator 21, time weighting calculator 22, representative DoA unit vector estimator 110, frequency weighting calculator 120, and multiplier 24.

Note that, in FIG. 13, the operations of mean DoA unit vector estimator 21, time weighting calculator 22 and multiplier 24 are the same as those in FIG. 5, and descriptions thereof are omitted.

In FIG. 13, representative DoA unit vector estimator 110 estimates (i.e., selects) representative DoA unit vector $\bar{u}(\tau)$ from among DoA unit vectors $u(\tau,k)$ respectively corresponding to a plurality of frequency bins in each time frame $\tau$, for example, according to the following Equation 8:

[8]

$$\bar{u}(\tau) = u(\tau, k_i) \text{ where} \qquad \text{(Equation 8)}$$

$$i = \min_i \left( \sum_{j=1}^{N} \|u(\tau, k_i) - u(\tau, k_j)\| \right).$$

With Equation 8, the following DoA unit vector is selected as representative DoA unit vector $\bar{u}(\tau)$ in time frame $\tau$ by representative DoA unit vector estimator 110: DoA unit vector $u(\tau,k_i)$ in frequency bin $k_i$ with the smallest sum of Euclidean distances (i.e., L2-norm) between DoA unit vector $u(\tau,k_i)$ in a frequency bin of interest (e.g., $k_i$) and DoA unit vectors $u(\tau,k_j)$ in frequency bins (e.g., $k_j$) other than the frequency bin of interest.

In FIG. 13, frequency weighting calculator 120 calculates frequency weighting factor $\bar{\lambda}(\tau,k)$, for example, according to the following Equation 9:

[9]

$$\bar{\lambda}(\tau, k) = 1 - \frac{1}{\pi} \cos^{-1} \frac{u(\tau, k)^T \bar{u}(\tau)}{\|u(\tau, k)\| \|\bar{u}(\tau)\|}. \qquad \text{(Equation 9)}$$

Frequency weighting calculator 120 uses a similar equation to Equation 6 used by frequency weighting calculator 23 illustrated in FIG. 5 as indicated in Equation 9, but mean DoA unit vector $\hat{u}(\tau)$ is replaced by representative DoA unit vector $\bar{u}(\tau)$. In other words, frequency weighting calculator 120 assumes the direction corresponding to representative DoA unit vector $\bar{u}(\tau)$ to be a sound source direction (DoA of an acoustic signal) in time frame $\tau$.

Multiplier 24 estimates weighting factor $\bar{w}_1(\tau,k)$ by the product of $\psi(\tau)$ and $\bar{\lambda}(\tau, k)$.

As described above, direction-of-arrival estimation apparatus 100 calculates weighting factor $w^{-1}(\tau,k)$ based on the difference (e.g., Euclidean distance) between the DoA unit vectors that are respectively present in the plurality of frequency bins, and performs DoA estimation based on the calculated weighting factor $\bar{w}_1(\tau,k)$.

Incidentally, DoA unit vector $u(\tau,k)$ per frequency bin k in each time frame $\tau$ possibly varies due to the effect of outliers such as a non-target sound source, ambient noise, and echoes, as described above.

Suppose that a single sound source is present (i.e., is active) in each time frame $\tau$, and a number of frequency bins k each corresponding to the single sound source and a few frequency bins k corresponding to the noise, etc. are included. In this case, the DoA unit vectors in frequency bins k corresponding to the single sound source (i.e., DoA unit vector group corresponding to a dominant sound source) possibly indicate similar directions. Meanwhile, the DoA unit vectors in frequency bins k corresponding to the noise, etc. possibly indicate different directions (e.g., random directions or scattered directions) from each other.

In this assumption, the representative DoA unit vector with the minimum Euclidean distance (i.e., difference or error) to another DoA unit vector is likely to be one of the DoA unit vectors in frequency bins k corresponding to the single sound source, rather than the DoA unit vector in frequency bin k corresponding to the noise, etc. In other words, the DoA unit vector that is present around the center of the above-mentioned DoA unit vector group corresponding to the dominant sound source, for example, is selected as the representative DoA unit vector.

The representative DoA unit vector is thus likely to be a vector closer to the original direction of the sound source among the DoA unit vectors corresponding to the plurality of frequency bins k. In other words, the representative DoA unit vector is unlikely to be a DoA unit vector affected by outliers.

This enables direction-of-arrival estimation apparatus 100 to estimate the DoA, even when a non-target sound source, ambient noise, or echoes, for example, are present, based on the weighting factor calculated using the representative DoA unit vector that does not include the components of the outliers as bias. In other words, direction-of-arrival estimation apparatus 100 configures the weighting factors for the DoA unit vectors corresponding to the ambient noise, echoes, etc. to be low, and does not use the DoA unit vectors for the DoA estimation (i.e., selection or clustering processing). Thus, direction-of-arrival estimation apparatus 100 can perform robust DoA estimation with a non-target sound source, ambient noise, or echoes, thereby improving the accuracy of the DoA estimation.

Additionally, in a case of a sound having a harmonic structure such as a vowel of speech, for example, signal components are sometimes concentrated in the peak portion of the harmonics, and the portion between the valleys of the spectrum is buried in the background noise accordingly, as described above. Even in such a case, the representative DoA unit vector is less susceptible to the noise components, for example, and thus direction-of-arrival estimation apparatus 100 can perform robust DoA estimation with the non-target sound source, ambient noise, or echoes.

Further, when sound sources are present close to each other, for example, the direction between (e.g., middle of) directions of these sound sources may be incorrectly estimated in the DoA estimation based on the mean DoA unit vector described above (e.g., see FIG. 3), for example. In the present embodiment, however, direction-of-arrival estimation apparatus 100 configures the DoA unit vector corresponding to any one of the directions of the sound sources close to each other to be the representative DoA unit vector, thereby improving the accuracy of the DoA estimation.

In other words, even in a frame where a plurality of sound sources are present, direction-of-arrival estimation apparatus 100 only needs to configure the DoA unit vector that is present around the center of the DoA unit vector group corresponding to a dominant sound source (e.g., a group having more DoA unit vectors) among the plurality of sound sources to be the representative DoA unit vector. This allows direction-of-arrival estimation apparatus 100 to perform the DoA estimation for the sound source corresponding to the representative DoA unit vector while reducing the effect of the DoA unit vectors of sound sources other than the sound source corresponding to representative DoA unit vector among the plurality of sound sources.

In addition, prior information on spacing between the sound sources, for example, is not required according to the present embodiment.

Note that, although a description has been given with Equation 8 of the case where the representative DoA unit vector is the DoA unit vector in the frequency bin with the smallest sum of the Euclidean distances to the DoA unit vectors in other frequency bins, the method of determining the representative DoA unit vector is not limited to the case. For example, the representative DoA unit vector may be selected from the DoA unit vectors in which the sum of the Euclidean distances to the DoA unit vectors in other frequency bins is less than or equal to a threshold.

(Variation 1)

In Variation 1, the time weighting factor is a binarized value (e.g., 0 or 1) of a value calculated based on a mean value (e.g., mean DoA unit vector) of DoA unit vectors in a plurality of frequency bins (e.g., frequency components) in each time frame (e.g., time component) $\tau$.

Figure 14:
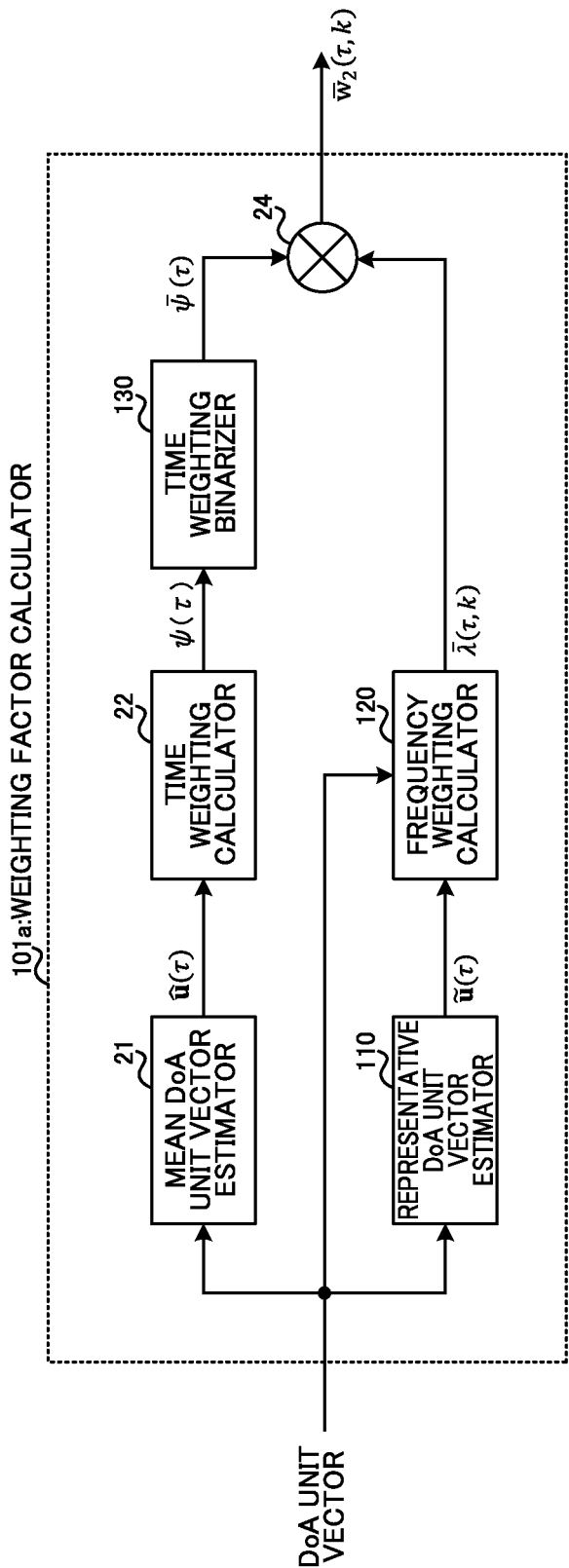
FIG. 14 is a block diagram illustrating an exemplary configuration of a weighting factor calculator according to Variation 1.

FIG. 14 is a block diagram illustrating an exemplary configuration of weighting factor calculator 101a according to Variation 1.

Note that, in FIG. 14, the same components as those in FIG. 13 are denoted by the same reference signs, and descriptions thereof are omitted. For example, time weighting binarizer 130 is included in FIG. 14, and this is a difference from FIG. 13.

Time weighting binarizer 130 determines (i.e., performs clustering) whether time weighting factor $\psi(\tau)$ inputted from time weighting calculator 22 belongs to, for example, a cluster (i.e., category or group) of large values or a cluster of small values. For example, time weighting binarizer 130 configures time weighting factor $\psi^-(\tau)$ belonging to the cluster of large values to 1, and time weighting factor $\psi^-(\tau)$ belonging to the cluster of small values to 0. Time weighting binarizer 130 outputs time weighting factor $\psi^-(\tau)$ to multiplier 24.

For example, time weighting binarizer 130 may categorize time weighting factor $\psi(\tau)$ into a cluster of equal to or greater than a threshold (time weighting factor $\psi^-(\tau)=1$) and a cluster of less than the threshold (time weighting factor $\psi^-(\tau)=0$).

Note that the threshold may be configured in advance, for example. For example, time weighting binarizer 130 may cluster the time weighting factor into two clusters according to K-means clustering, or Fuzzy c-means clustering, for example, based on a database including time weighting factors $\psi(\tau)$ determined in a plurality of time frames. Time weighting binarizer 130 may then configure the mean value (or midpoint) of the centroids of the two clusters to be the threshold.

In FIG. 14, multiplier 24 estimates weighting factor $w^-_2(\tau,k)$ by the product of $\psi^-(\tau)$ and $\lambda^-(\tau,k)$.

According to Variation 1, weighting factor calculator 101a, for example, calculates weighting factor $w^-_2(\tau,k)$ based on the DoA unit vector in time frame $\tau$ corresponding to time weighting factor $\psi(\tau)$ equal to or greater than the threshold, that is, time frame $\tau$ in which a single sound source is more likely to be present. In other words, weighting factor calculator 101a calculates with more emphasis the time weighting factor for time frame $\tau$ in which a single sound source is more likely to be present (in other words, time frame $\tau$ that is more likely to correspond to the correct DoA).

This allows direction-of-arrival estimation apparatus 100 to perform DoA estimation based on the DoA unit vectors in time frame $\tau$ that are unlikely to include a non-target sound source, ambient noise, or echoes, for example, thereby improving the accuracy of the DoA estimation.

Further, according to Variation 1, the time weighting factor in time frame τ in which a sound source (i.e., single sound source) is likely to be present is emphasized compared to the time weighting factor in time frame τ in which a single sound source is unlikely to be present. This allows direction-of-arrival estimation apparatus 100 to estimate weighting factor $w^-_2(\tau,k)$ based on, for example, a result of the DoA estimation in time frame τ in which a single sound source is more likely to be present (in other words, time frame τ that is more likely to correspond to the correct DoA). In other words, the estimation of weighting factor $w^-_2(\tau,k)$ is less affected by a result of the DoA estimation in time frame τ in which a single sound source is unlikely to be present (in other words, time frame τ that is unlikely to correspond to the correct DoA). Thus, even in a case where sound sources are present close to each other, for example, direction-of-arrival estimation apparatus 100 can more easily configure the DoA unit vectors respectively corresponding to the directions of the sound sources to be the representative DoA unit vectors in each time frame τ in which each of the sound sources close to each other is active, thereby improving the accuracy of the DoA estimation.

(Variation 2)

Figure 15:
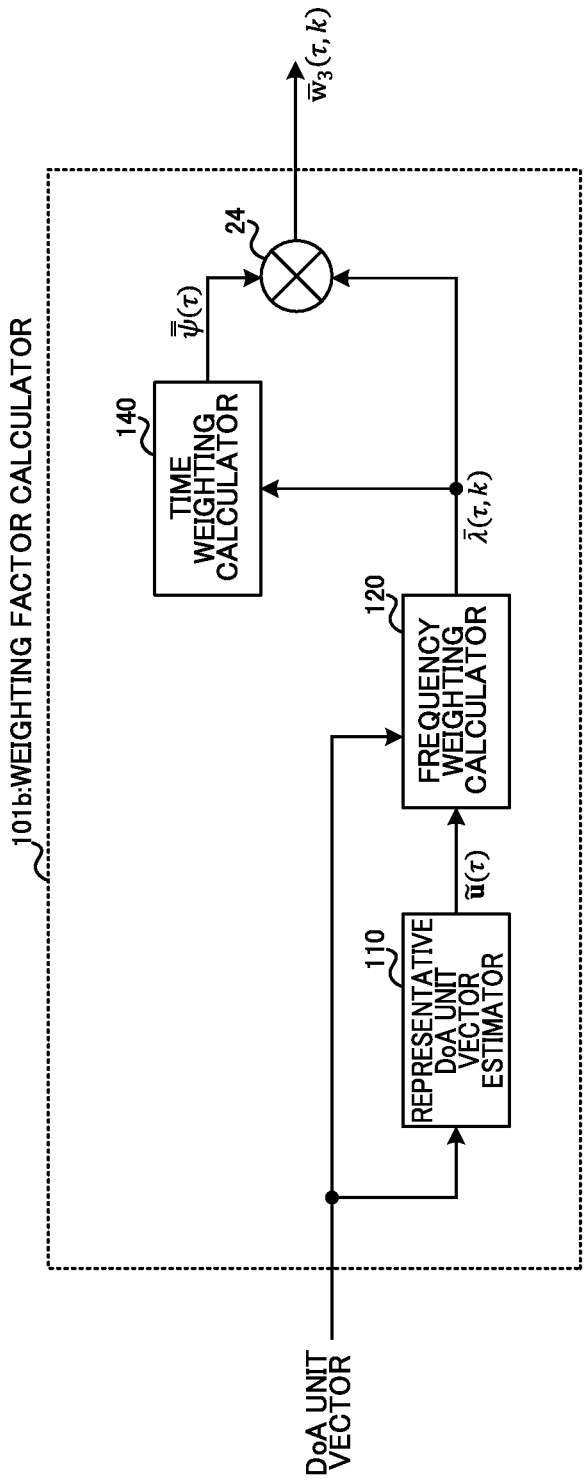
FIG. 15 is a block diagram illustrating an exemplary configuration of a weighting factor calculator according to Variation 2.

FIG. 15 is a block diagram illustrating an exemplary configuration of weighting factor calculator 101b according to Variation 1.

Note that, in FIG. 15, the same components as those in FIG. 13 are denoted by the same reference signs, and description thereof is omitted. For example, FIG. 15 does not include mean DoA unit vector estimator 21 compared with FIG. 13, and includes time weighting calculator 140 instead of time weighting calculator 22.

In FIG. 15, time weighting calculator 140 calculates time weighting factor $\psi^-(\tau)$ based on frequency weighting factor $\lambda^-(\tau,k)$ inputted from frequency weighting calculator 120. For example, time weighting calculator 140 calculates time weighting factor $\psi^-(\tau)$ according to the following Equation 10:

[10]

$$\overline{\psi}(\tau) = \frac{1}{K}\sum_{k=0}^{K-1}\overline{\lambda}(\tau, k).$$ (Equation 10)

As indicated in Equation 10, time weighting factor $\psi^-(\tau)$ is a mean value of frequency weighting factors $\lambda^-(\tau,k)$ in time frame τ.

Herein, frequency weighting factor $\lambda^-(\tau,k)$ in each time frame τ and each frequency bin k is determined, for example, according to how far the corresponding DoA unit vector $u(\tau,k)$ is from representative DoA unit vector $u^\sim(\tau,k)$. For example, the farther DoA unit vector $u(\tau,k)$ is from representative DoA unit vector $u^\sim(\tau,k)$, the smaller frequency weighting factor $\lambda^-(\tau,k)$ is.

Thus, the more frequency bins that have unit vectors $u(\tau,k)$ far from representative DoA unit vector $u^\sim(\tau,k)$ in each time frame τ, the more likely a sound source is present in a direction different from the direction of the representative DoA unit vector, and the mean value (i.e., $\psi^{32}(\tau)$) of frequency weighting factors $\lambda^-(\tau,k)$ is also smaller. In contrast, the more frequency bins that have unit vectors $u(\tau,k)$ close to representative DoA unit vector $u^\sim(\tau,k)$ in each time frame τ, the more likely a sound source is present in the direction of representative DoA unit vector, and the mean value (i.e., $\psi^-(\tau)$) of frequency weighting factors $\lambda^-(\tau,k)$ is also higher.

Thus, time weighting factor $\psi^-(\tau)$ is an indicator of the possibility that two or more sound sources are present as the mean value of weighting factors $\lambda^-(\tau,k)$ is smaller. In other words, time weighting factor $\psi^-(\tau)$ is an indicator of the possibility that a single sound source is present as the mean value of weighting factors $\lambda^-(\tau,k)$ is higher.

As described above, according to Variation 2, weighting factor calculator 101b calculates the weighting factor based on, for example, the DoA unit vectors in time frame τ with higher time weighting factors $\psi^-(\tau)$, that is, time frame τ in which a single sound source is more likely to be present. This allows direction-of-arrival estimation apparatus 100 to perform DoA estimation based on the DoA unit vectors in time frame τ that are unlikely to include a non-target sound source, ambient noise, or echoes, for example, thereby improving the accuracy of the DoA estimation.

Note that it is irrelevant how far the sound source(s) is from a microphone in a case where the time weighting factor is an index indicating either a single sound source and a plurality of sound sources. Time weighting calculator 140 may thus calculate time weighting factor $\psi^-(\tau)$ according to, for example, the following Equation 11:

$$\overline{\overline{\psi}}(\tau) = \frac{1}{K}\sum_{k=0}^{K-1}\overline{\overline{\lambda}}(\tau, k) \text{ where}$$ (Equation 11)

$$\overline{\overline{\lambda}}(\tau, k) = \begin{cases} 1 & (\text{if } \overline{\lambda}(\tau, k) > Th) \\ 0 & (\text{if } \overline{\lambda}(\tau, k) \leq Th) \end{cases}.$$

"Th" here indicates a threshold defining a range of λ allowed as a single sound source. In other words, time weighting calculator 140 may calculate the time weighting factor based on a binarized value (either 0 or 1) of frequency weighting factor $\lambda^-(\tau,k)$.

This enables weighting factor calculator 101b to calculate with more emphasis time weighting factor $\psi^-(\tau)$ for time frame τ in which a single sound source is more likely to be present (in other words, time frame τ that is more likely to correspond to the correct DoA), thereby improving the accuracy of DoA estimation.

(Variation 3)

The above embodiments and Variations 1 and 2 have provided the descriptions in the case of using the Euclidean distance to calculate the representative DoA unit vector. A parameter other than the Euclidean distance may be used, however, to calculate the representative DoA unit vector. For example, the calculation of the representative DoA unit vector may use the angular distance expressed in the following Equation 12:

[12]

$$\overline{u}(\tau) = u(\tau, k_i) \text{ where}$$ (Equation 12)

$$i = \min_i\left(\sum_{j=1}^{N}\cos^{-1}\frac{u(\tau, k_i)^T u(\tau, k_j)}{\|u(\tau, k_i)\|\|u(\tau, k_j)\|}\right).$$

An exemplary embodiment of the present disclosure has been described, thus far.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A direction-of-arrival estimation apparatus according to an embodiment of the present disclosure includes: calculation circuitry, which, in operation, calculates a frequency weighting factor for each of a plurality of frequency components of a signal recorded by a microphone array based on a difference between unit vectors each indicating a direction of a sound source in a corresponding one of the plurality of frequency components; and estimation circuitry, which, in operation, estimates a direction of arrival of the signal from the sound source based on the frequency weighting factor.

In an embodiment of the present disclosure, the calculation circuitry calculates the frequency weighting factor based on a unit vector where a difference from a unit vector of another frequency component is smallest among the unit vectors of the plurality of frequency components.

In an embodiment of the present disclosure, the difference is at least one of a Euclidean distance and/or an angular distance between the unit vectors.

In an embodiment of the present disclosure, the calculation circuitry calculates, in addition to the frequency weighting factor, a time weighting factor for a time component of the signal, and the estimation circuitry estimates the direction of arrival based on a product of the frequency weighting factor and the time weighting factor.

In an embodiment of the present disclosure, the time weighting factor is a binarized value of a value calculated based on a mean value of the unit vectors of the plurality of frequency components in each time component.

In an embodiment of the present disclosure, the calculation circuitry calculates the time weighting factor based on the frequency weighting factor.

In an embodiment of the present disclosure, the calculation circuitry calculates the time weighting factor based on a binarized value of the frequency weighting factor.

A system according to an embodiment of the present disclosure includes: a direction-of-arrival estimation apparatus, which in operation, estimates a direction of arrival of a signal from a sound source; a beamformer, which in operation, extracts an acoustic signal by beamforming toward the direction of arrival; an encoder, which in operation, encodes the acoustic signal; and a decoder, which in operation, decodes the encoded acoustic signal, wherein, the direction-of-arrival estimation apparatus calculates a frequency weighting factor for each of a plurality of frequency components of the signal recorded by a microphone array based on a difference between unit vectors each indicating a direction of the sound source in a corresponding one of the plurality of frequency components, and estimates the direction of arrival based on the frequency weighting factor.

A direction-of-arrival estimation method according to an embodiment of the present disclosure includes: calculating, by a direction-of-arrival estimation apparatus, a frequency weighting factor for each of a plurality of frequency components of a signal recorded by a microphone array based on a difference between unit vectors each indicating a direction of a sound source in a corresponding one of the plurality of frequency components; and estimating, by the direction-of-arrival estimation apparatus, a direction of arrival of the signal from the sound source based on the frequency weighting factor.

The disclosure of Japanese Patent Application No. 2019-082998, filed on Apr. 24, 2019, including the specification, drawings and abstract, is incorporated herein by reference in its entirety.

INDUSTRIAL APPLICABILITY

An exemplary embodiment of the present disclosure is useful for acoustic signal transmission systems and the like.

REFERENCE SIGNS LIST 1, 100 Direction-of-arrival estimation apparatus
10 DoA unit vector estimator
20, 101, 101a, 101b Weighting factor calculator
21 Mean DoA unit vector estimator
22, 140 Time weighting calculator
23, 120 Frequency weighting calculator
24 Multiplier
30 Selector
40 Clusterer
110 Representative DoA unit vector estimator
130 Time weighting binarizer
200, 200-1, 200-2 Beamformer
300, 300-1, 300-2 Coding apparatus
400, 400-1, 400-2 Decoding apparatus
500, 500-1, 500-2 Metadata coding apparatus
600 Multiplexer
700 Demultiplexer
800, 800-1, 800-2 Metadata decoding apparatus
900 Renderer
1000 Adder
1100 Subtractor

The invention claimed is:

1. A direction-of-arrival estimation apparatus, comprising:
    direction of arrival (DoA) unit vector estimation circuitry that estimates a DoA unit vector that indicates a direction of a sound source for each of a plurality of frequency bins of a signal arriving from the sound source using the signal recorded by a microphone array;
    calculation circuitry that selects, from among the estimated DoA unit vectors, as a representative DoA unit vector, a DoA unit vector in one frequency bin in which a sum of differences between the DoA unit vector and DoA unit vectors of other frequency bins is a minimum, and calculates a frequency weighting factor for each of the plurality of frequency bins based on the selected representative DoA unit vector; and
    estimation circuitry that selects, from among the estimated DoA unit vectors, DoA unit vectors based on the calculated frequency weighting factor, and estimates the direction of arrival of the signal using the selected DoA unit vectors.

2. The direction-of-arrival estimation apparatus according to claim 1, wherein the calculation circuitry calculates a frequency weighting factor such that the smaller the difference with the representative DoA unit vector is, the larger the frequency weighting factor becomes; and
    the estimation circuitry selects DoA unit vectors to which large frequency weighting factors are to be applied finds the centroid of the selected DoA unit vectors and estimates the direction of arrival.

3. The direction-of-arrival estimation apparatus according to claim 1, wherein the difference is at least one of a Euclidean distance and/or an angular distance between the unit vectors.

4. The direction-of-arrival estimation apparatus according to claim 1, wherein,
    the calculation circuitry calculates, in addition to the frequency weighting factor, a time weighting factor for a time component of the signal, and
    the estimation circuitry estimates the direction of arrival based on a product of the frequency weighting factor and the time weighting factor.

5. The direction-of-arrival estimation apparatus according to claim 4, wherein the time weighting factor is a binarized value of a value calculated based on a mean value of the DoA unit vectors of the plurality of frequency bins in each time component.

6. The direction-of-arrival estimation apparatus according to claim 4, wherein the calculation circuitry calculates the time weighting factor based on the frequency weighting factor.

7. The direction-of-arrival estimation apparatus according to claim 6, wherein the calculation circuitry calculates the time weighting factor based on a binarized value of the frequency weighting factor.

8. A system, comprising:
    a direction-of-arrival estimation apparatus that estimates a direction of arrival of a signal arriving from a sound source;
    a beamformer that extracts an acoustic signal by beamforming toward the direction of arrival;
    an encoder that encodes the acoustic signal; and
    a decoder that decodes the encoded acoustic signal;
    wherein the direction-of-arrival estimation apparatus:
        estimates a direction of arrival (DoA) unit vector that indicates a direction of the sound source for each of a plurality of frequency bins of the signal arriving from the sound source using the signal recorded by a microphone array;
        selects, from among the estimated DoA unit vectors, as a representative DoA unit vector a DoA unit vector in one frequency bin in which a sum of differences between the DoA unit vector and DoA unit vectors of other frequency bins is a minimum, and calculates a frequency weighting factor for each of the plurality of frequency bins based on the selected representative DoA unit vector; unit and
        selects, from among the estimated DoA unit vectors, DoA unit vectors based on the calculated frequency weighting factors and estimates the direction of arrival of the signal using the selected DoA unit vectors.

9. A direction-of-arrival estimation method, comprising:
    estimating, by a direction-of-arrival estimation apparatus, a direction of arrival (DoA) unit vector that indicates a direction of a sound source for each of a plurality of frequency bins of a signal arriving from the sound source using the signal recorded by a microphone array;
    selecting, by the direction-of-arrival estimation apparatus, from among the estimated DoA unit vectors, as a representative DoA unit vector a DoA unit vector in one frequency bin in which a sum of differences between the DoA unit vector and DoA unit vectors of other frequency bins is a minimum;
    calculating, by the direction-of-arrival estimation apparatus, a frequency weighting factor for each of the plurality of frequency bins based on the selected representative DoA unit vector; and
    selecting, by the direction-of-arrival estimation apparatus, from among the estimated DoA unit vectors, DoA unit vectors based on the calculated frequency weighting factors and estimating, by the direction-of-arrival estimation apparatus, the direction of arrival of the signal using the selected DoA unit vectors.

\* \* \* \* \*